H. B. HARTMAN.
OZONE GENERATOR.
APPLICATION FILED JAN. 24, 1920.
1,423,658.
Patented July 25, 1922.
3 SHEETS—SHEET 1.
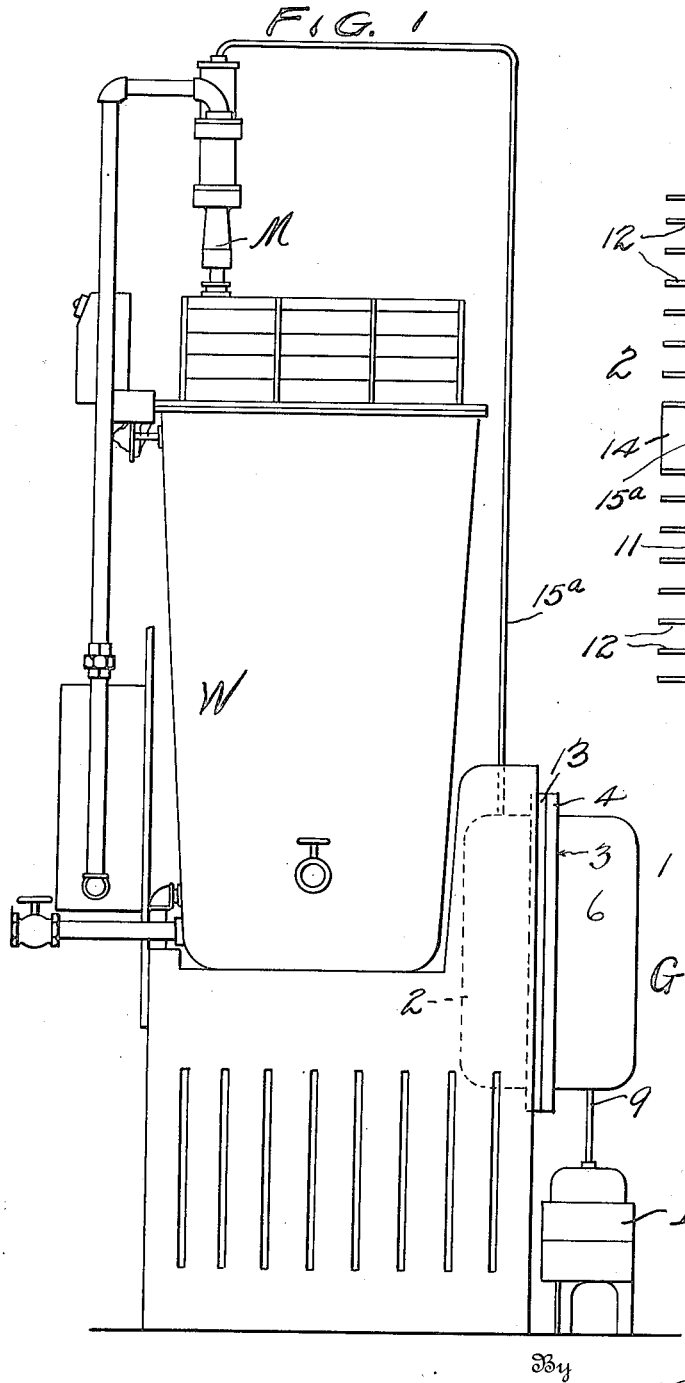
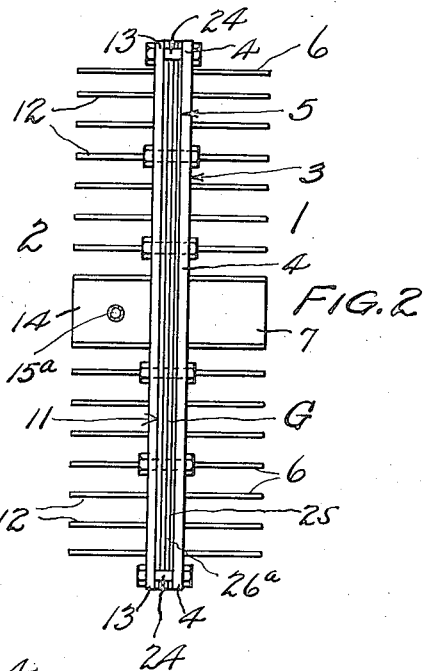
Inventor
HARRY B HARTMAN
By
Attorney

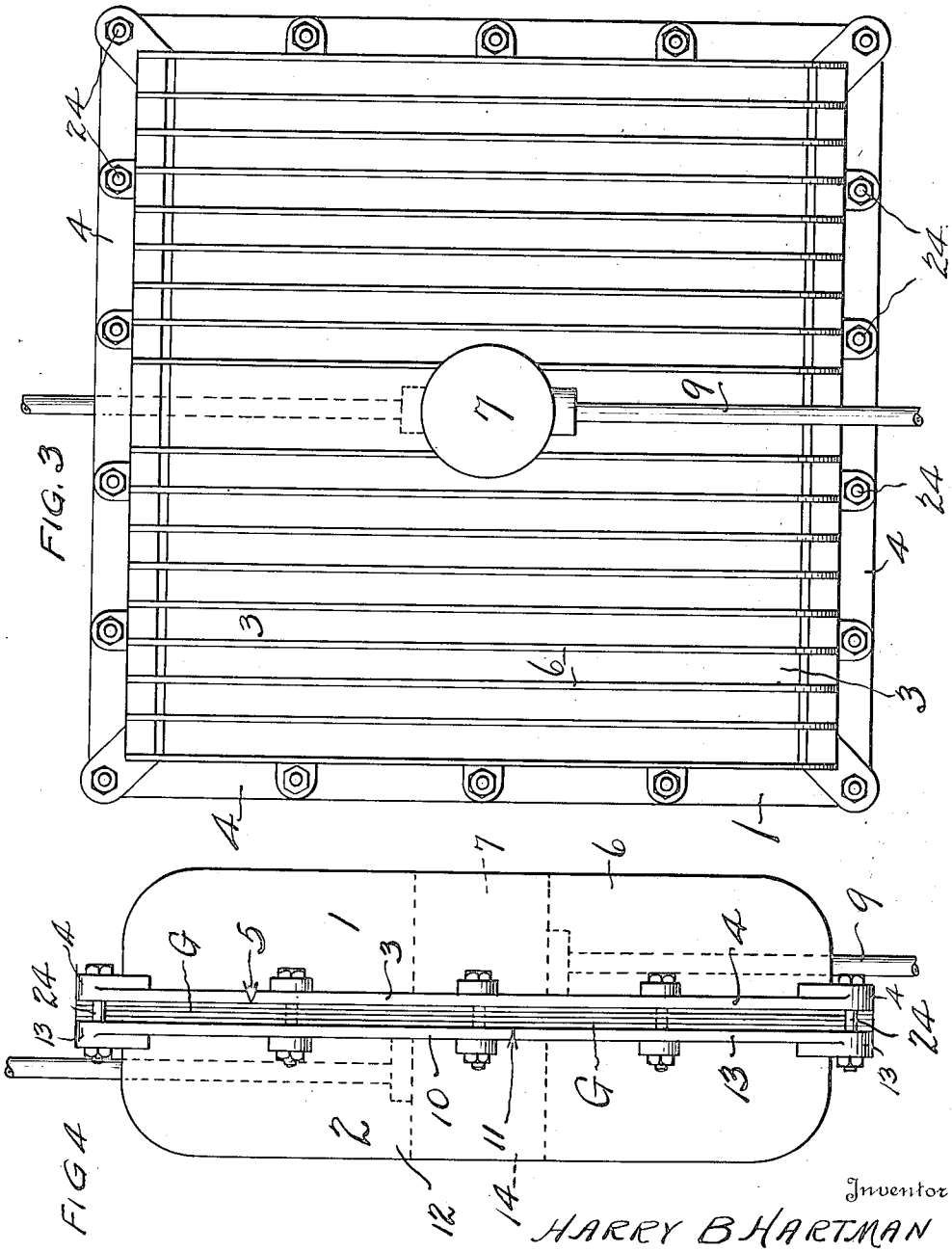

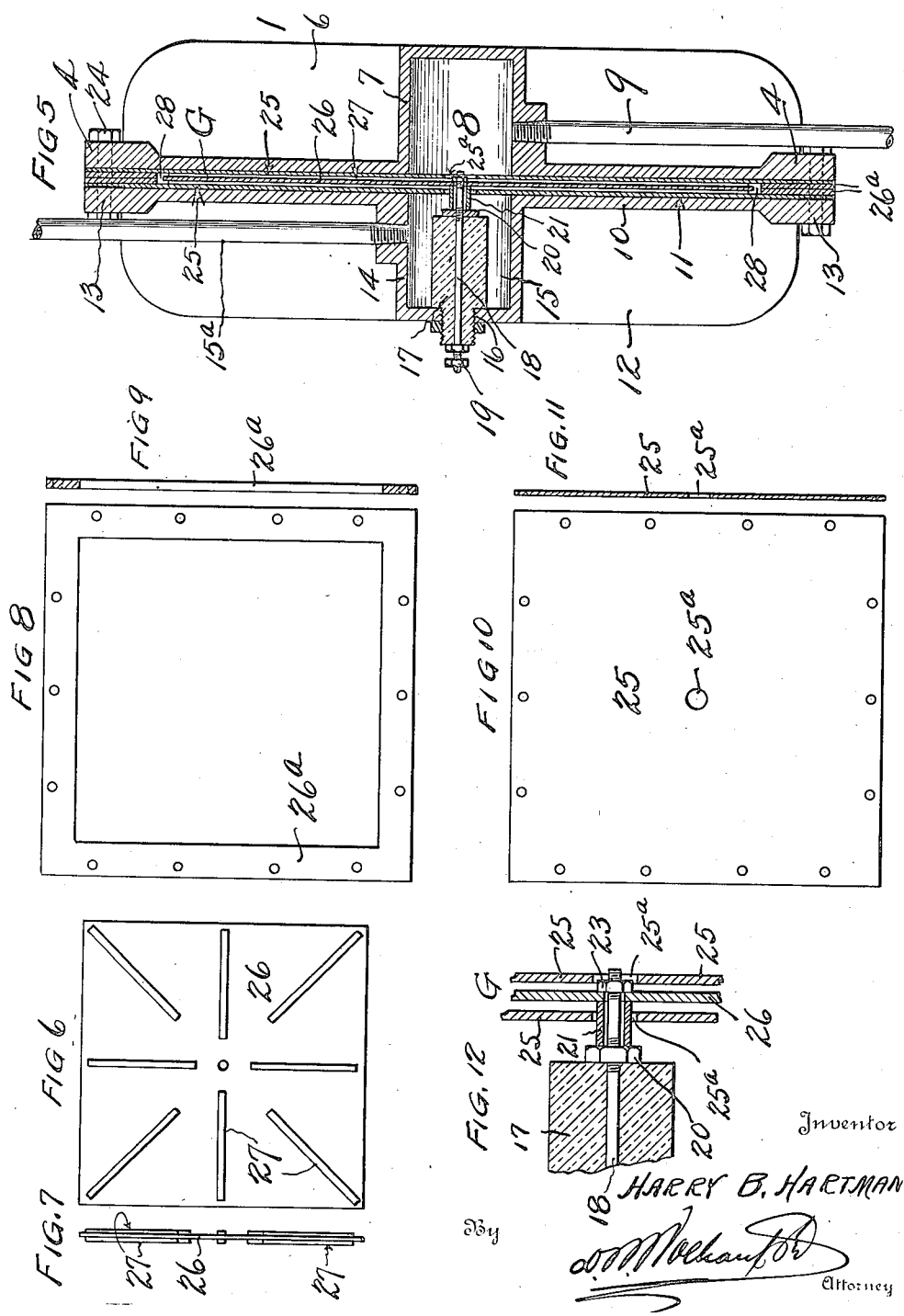

UNITED STATES PATENT OFFICE.

HARRY BUXTON HARTMAN, OF SCOTTDALE, PENNSYLVANIA, ASSIGNOR TO ELECTRIC WATER STERILIZER AND OZONE COMPANY, OF SCOTTDALE, PENNSYLVANIA, A CORPORATION OF PENNSYLVANIA.

OZONE GENERATOR.

1,423,658.        Specification of Letters Patent.      Patented July 25, 1922.

Application filed January 24, 1920. Serial No. 353,858.

*To all whom it may concern:*

Be it known that I, HARRY B. HARTMAN, citizen of the United States, residing at Scottdale, in the county of Westmoreland and State of Pennsylvania, have invented certain new and useful Improvements in Ozone Generators, of which the following is a specification.

This invention relates to an improvement in ozone generating apparatus, and has particular reference to a device of that kind especially adapted for use in connection with water purifying machinery.

One of the objects of the invention is to provide a simple and practical construction which will efficiently generate the ozone automatically in sufficient quantity to meet the needs of the water purifying machine of which it is a part. On account of the high-current voltage necessary in the electrical action of producing the ozone, considerable heat is generated and in order to preserve the proper working efficiency of the device it is necessary that the same be constructed in such a manner that it will not overheat to an excessive degree. In this connection it is desirable to utilize a construction which will dissipate or radiate the heat of generation, without the necessity of employing artificial cooling means such as water, or a fan, thereby greatly reducing the cost of maintenance of the apparatus, since as a general rule in plants or places where a machine of this character is installed it is desired to use the water as economically as possible. Furthermore, the present arrangement eliminates considerable piping and fittings which would otherwise be necessary in a water cooled construction.

Another object of the invention is to provide a novel ozone generating unit. In an ozone generating apparatus one of the defects commonly met with is the tendency of the dielectrics to be ruptured on account of the strain incident to the temperature difference on opposite sides of the dielectric plate, and the present invention therefore has in view an extensive air cooled radiating surface so distributed about the entire device as to maintain uniform temperature conditions as well as to provide for keeping the apparatus sufficiently cool to prevent the objectionable conditions which arise from overheating.

Also the invention contemplates a construction which is of a very simple nature, permitting the parts to be readily taken apart for replacement or adjustment with great facility and minimum expense.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings in which:

Figure 1 is a side elevation of a water purifying apparatus showing the application of the invention.

Figure 2 is a top plan view of the device.

Figure 3 is a front elevation.

Figure 4 is a side elevation.

Figure 5 is a vertical sectional view.

Figure 6 is a plan view of the aluminum plate which is connected with one of the terminals of the electrical circuit.

Figure 7 is an edge view of the aluminum plate.

Figure 8 is a plan view of the insulating gasket.

Figure 9 is a cross-section of the gasket shown in Figure 8.

Figure 10 is a plan view of one of the dielectric sheets or plates used in conjunction with the aluminum plate of Figure 6.

Figure 11 is a cross-sectional view of the plate shown in Figure 10.

Figure 12 is a detail view of the end of the conductor plug that connects with the metallic electrode.

Similar reference numerals designate corresponding parts throughout the several figures of the drawings.

Although the present invention is susceptible of general use in application and connection with generating ozone for water purifying purposes, it is especially useful in connection with the type of machine illustrated and claimed in my Patent No. 1,363,589 dated Dec. 28, 1920 and shown in Figure 1 of the present drawings.

Primarily the generator G consists of a pair of complemental casing members or sections which are substantially duplicates of each other in general design, but vary in details to a certain degree in order to meet the necessary structural requirements for properly generating the ozone. These members clamp therebetween the ozone generating unit comprising a metallic electrode member and suitable dielectric plates which co-operate in the necessary electrical action to produce the ozone from the air when an alternating current is connected with the metallic electrode as a part of the circuit which is grounded to the casing members themselves.

Accordingly, as will be observed from the drawings it will be seen that the casing member 1 constitutes an air intake section and the casing member 2 constitutes an ozone delivery section. Referring first to the member 1 it may be observed that the same consists of a relatively flat plate or body portion 3 having an extended bolting flange 4 around its entire perimeter, while one side of the said body is provided with a flat face 5 and the opposite side is formed with a plurality of spaced parallel heat radiating ribs 6 arranged at regular intervals throughout the width of the body. As will also be observed from Figure 3 the central portion of the body 3 is formed with an air intake housing 7 which may be of the formation clearly shown in Figures 2 and 4 to thereby provide an air intake chamber 8 opening through the flat side 5 of the plate. The said air intake chamber 8 is preferably fitted with an air supply pipe 9 that communicates with a dehydrator D or other device for preliminarily absorbing the moisture in the air before it enters the chamber 8.

The opposite casing member 2 which constitutes the ozone delivery section also consists of a body 10 having the flat face 11 and the spaced heat radiating ribs 12 together with the bolting flange 13 at the edge of the body. Also as in the case of the other casing member the body 10 is provided with a centrally located housing 14 which provides a chamber 15 opening toward the chamber 8 when the two sections are in assembled relation, but not adapted to communicate directly therewith as will presently appear.

The housing 14 of the casing member 2 is provided at the closed outer end thereof with a threaded opening 16 for receiving the reduced shank portion of an insulating sleeve 17 of a terminal plug P which includes the conductor rod 18 extending through the sleeve 17 and adapted to be connected with one of the line or circuit terminals in the conventional manner by the binding nut 19. The end of the conductor 18 which projects beyond the inner end of the porcelain sleeve 17 is preferably fitted with a nut 20 which acts in opposition to the lock nut on the exposed end of the conductor, and may be further surrounded by an insulating sleeve 21, while the inner extremity 22 of the conductor rod is preferably formed to receive a nut 23 for co-operating with the metallic electrode member of the generating unit which will be presently referred to.

The chamber 15 of the casing member 2 is fitted with a discharge pipe 15$^a$ leading to the mixer M of the water purifying apparatus W so that ozone generated within the generating unit located between the casing members 1 and 2 may be conveniently carried to the point of use. In view of the general structural features and characteristics of the said casing members 1 and 2 it will be apparent that they may be readily assembled with their flat faces toward each other to clamp the generating unit, designated generally as G, between the same where it may be held rigidly in operating position by means of the bolts 24 extending through the opposite flange members 4 and 13 of the sections 1 and 2 respectively.

From Figures 5 to 11 inclusive the novel construction of the generating unit may be clearly observed. The same essentially consists of a pair of dielectric elements 25'—25 which are preferably in the form of plates or sheets of suitable dielectric insulating material, preferably the material known as "Bakelite" which may be placed against the flat faces of the sections 1 and 2, and receive therebetween a metallic electrode member 26, preferably aluminum. This member 26 is provided on opposite sides thereof with the offset ribs or projections 27 which serve to space the main body thereof from the dielectric plates 25—25 to thereby provide an air gap on each side of the intermediate metallic member of the unit. As may also be observed from Figures 5 and 6 the aluminum member 26 is of a smaller size diametrically than the dielectric plates 25-25 to insure a space 28 entirely around the edge of the electrode so that there will be free and uninterrupted communication between the opposite sides thereof, as shown in Figure 5. Furthermore, in order to compensate for the maximum thickness of the metallic electrode member it is to be observed that suitable gaskets 26$^a$ may be employed to seal the space 28 at the edge of the generating unit when the same is assembled between the opposite casing forming members 1 and 2.

The dielectric plates 25—25 are preferably provided with the central openings 25$^a$ which as shown in Figure 5 respectively communicate with the air intake chamber 8 and ozone delivery chamber 15. It will thus be apparent that a relatively free path of communication may be established from the chamber 8 to the chamber 15 through the space provided between the aluminum member and the dielectric plates 25—25. And, as also shown in Figure 5 the nut 23 on the end 22 of the conductor 18 is in electrical engagement with the aluminum member, and therefore the latter constitutes one of the terminals of the generating circuit since the conductor rod or post 18 is connected with an electric supply line preferably leading from a transformer which increases the voltage of the current supplied to the proper degree from the generating action.

In use the casing members 1 and 2 are electrically grounded and therefore provide the other terminal in circuit with the aluminum member so that when the current is flowing through the device the said aluminum member will cooperate with the dielectric plates 25—25 to produce the ozone-generating "brush discharge" which is usually manifested in the so-called "violet rays." The current used in the generating action is an alternating current, and as a result of the electrical brush-discharge action set up by this type of current with dielectrics the ozone is produced in the air gap from the dried air which is drawn through the supply pipe 9 and into the chamber 8 and thence in through one of the openings 25$^a$, and around the member 26 to the chamber 15. The ozone is drawn from the chamber 15 as desired for use in connection with the water purifying action of the machine.

From the foregoing it will be apparent that the present invention provides an ozone generating device which essentially comprises two complemental casing sections, are so constructed that they may conveniently clamp a generating unit therebetween and furnish the ozone without the necessity of generating an excessive heat by reason of the novel distribution of heat radiating ribs or fins provided on each of the sections. In connection with these ribs it is to be observed that when the generator is installed for use the same is set in such a position that the ribs will be perpendicular thereby to provide in effect a plurality of vertical heat conducting flues which will cause the radiated heat to rapidly rise and clear the zone of the generator. In other words, the spaced parallel heat radiating fins of the sections 1 and 2 cooperate to produce draft flues or passages which materially assist in the cooling action.

Without further description it is thought that the many novel features and advantages of the present invention will be readily apparent to those skilled in the art and it will of course be understood that changes in the form, proportion and minor details of construction may be resorted to, without departing from the spirit of the invention or scope of the appended claims.

I claim:

1. An ozone generator comprising a casing consisting of relatively separable sections provided with vertically disposed radial ribs and centrally arranged chamber-forming members, a generating unit consisting of spaced dielectric members and an intermediate electrode arranged between said sections and the dielectrics being provided with openings, and a terminal plug arranged in one of the chambers and electrically connecting with the electrode of the generating unit at the central portion thereof.

2. An ozone generator including a casing consisting of relatively separable sections having vertically arranged heat radiating ribs and centrally arranged air intake and ozone discharging chamber-forming portions, a generating unit adapted to be positioned between the sections and including spaced dielectrics and an intermediate electrode member arranged to provide continuous communication from the air receiving chamber to the ozone discharging chamber, and a terminal plug carried by the wall of the ozone discharging chamber connecting with the electrode.

3. An ozone generator including a casing having air intake and ozone discharging chambers, a generating unit arranged in the casing between the chambers and consisting of dielectrics and an electrodes arranged in spaced relation and providing communication therebetween from the air intake chamber to the ozone discharging chamber, and a terminal for the electrode plate connected therewith directly in the path of air currents passing from the air receiving chamber to the ozone discharging chamber.

4. An ozone generator including a pair of casing members having relatively flat body portions and registering chambers, a generating unit including a pair of dielectric plates and intermediate electrode member arranged in spaced relation, said dielectric plates having openings communicating with the chambers of the casing members, and the electrode member arranged in obstructing relation to said openings and being of smaller area than the dielectric members to afford continuous communication from the chamber of one member to the chamber of the opposite member through the openings and about the edges of said electrode member.

5. An ozone generator including a pair of casing members having heat radiating means and centrally arranged housing portions forming air intake and ozone delivery chambers, a generating unit arranged between the casing forming members and including a pair of dielectric plates having openings and constituting insulating liners for the adjacent casing forming members, a metallic electrode member adapted to be interposed between the dielectric plates and being of a less area than the same and also provided with spacing ribs on opposite sides for forming an air gap between the opposite faces thereof and the dielectric plates, an electric conductor plug connected with the metallic electrode member, and means for holding the casing members and generating unit in position.

6. An ozone generator including a pair of casing members having relatively flat body portions and heat radiating means on the outer faces thereof, and also provided with centrally located housings forming registering air intake and ozone delivery chambers, an ozone generating unit arranged between the flat body portions of the casing forming members and including a pair of dielectric plates provided with central openings, and an intermediate metallic electrode member of less area than the dieletric plates and having spacing ribs on opposite sides thereof adapted to contact with the plates to form an air gap adapted to communicate with the air intake and ozone delivery chambers through the central openings of the dielectric plates, a conductor plug mounted in the ozone delivery chamber and in electrical contact with the electrode member, and means for holding the casing forming sections and generating unit in position.

7. An ozone generator including a pair of chambered casing members, a generating unit clamped therebetween and consisting of a pair of dielectric plates constituting insulating liners for the interior faces of the said casing members, said plates being provided with openings communicating with the chambers of the casing members, and an intermediate metallic electrode member having spacing ribs adapted to contact with the dielectric members to provide space communicating with the chambers through the openings in the dielectric plates, a conductor plug carried by one of the casing members and electrically connected with the metallic electrode member, and means for holding the casing members and generating unit in assembled relation.

8. An ozone generator including opposite casing members, a generating unit clamped therein and including a pair of dielectric plates and an intermediate metallic electrode member, and a gasket adapted to be interposed between the dielectric members at the edge thereof to constitute a spacer and filler to compensate for the maximum thickness of the electrode member and provide an intermedite air gap.

In testimony wherof I hereunto affix my signature.

HARRY BUXTON HARTMAN.

In the presence of—

EMORY L. GROFF.